No. 621,294.  
A. C. CULVER.  
JOINT FOR PARTS OF MACHINERY.  
(Application filed Nov. 19, 1898.)  
Patented Mar. 14, 1899.
(No Model.)
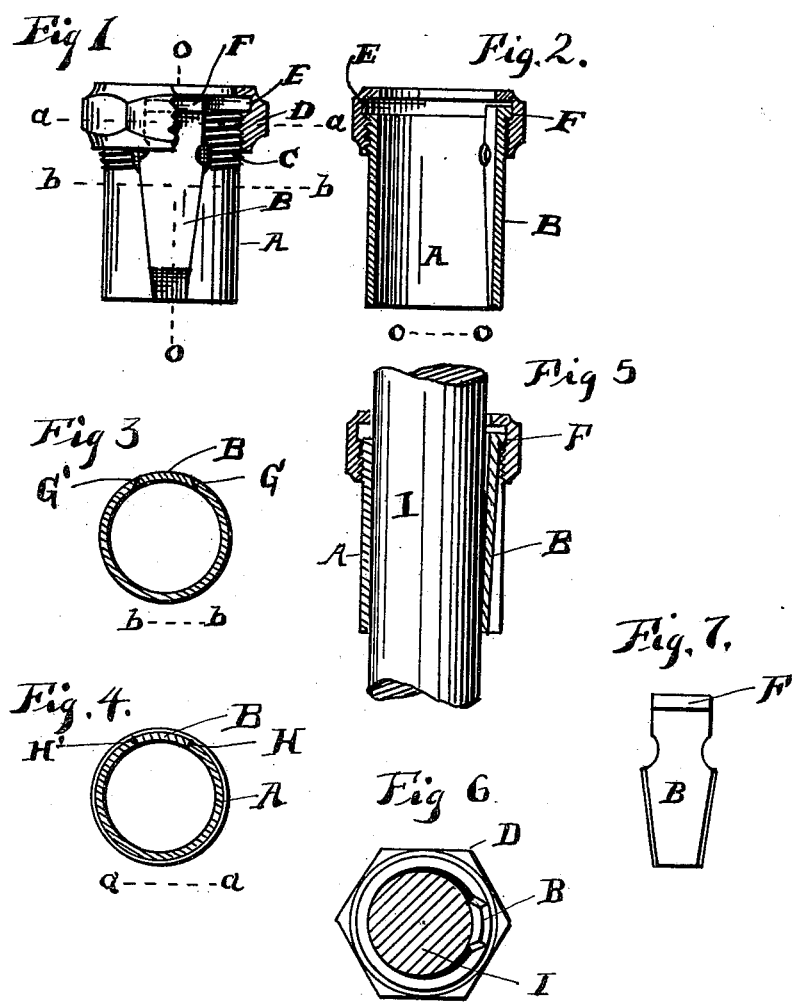
WITNESSES.
Harry J. Perkins.
Christopher Hondelink
INVENTOR.
Augustus C. Culver
By his ATTORNEY
Edward Taycant

UNITED STATES PATENT OFFICE.

AUGUSTUS C. CULVER, OF GRAND RAPIDS, MICHIGAN, ASSIGNOR TO CHARLES H. BERKEY, OF SAME PLACE.

JOINT FOR PARTS OF MACHINERY.

SPECIFICATION forming part of Letters Patent No. 621,294, dated March 14, 1899.

Application filed November 19, 1898. Serial No. 696,936. (No model.)

*To all whom it may concern:*

Be it known that I, AUGUSTUS C. CULVER, a citizen of the United States, residing at Grand Rapids, in the county of Kent and State of Michigan, have invented new and useful Improvements in Joints for Parts of Machinery, of which the following is a specification.

This invention relates to a new and efficient means for detachably uniting two parts of machinery, one of which is provided with a cylindrical socket. The same is peculiarly adapted for use in connection with the attachment of a bicycle seat-post and handle-bars for bicycles and may be applied to nearly all the bicycles as they are ordinarily constructed in order to adapt the same to receive the seat-post or handle-bar.

The objects of the invention are to provide a very simple and efficient means for uniting any two parts of machinery, one of which is provided with a socket; also, to limit the parts to the fewest number, thereby simplifying the construction of such device. These objects I accomplish by means of the mechanism illustrated in the accompanying drawings, in which—

Figure 1 shows a side elevation of my invention with a portion cut away in order to show the position of the tapering spreader with reference to the main body of the cylinder or bushing. Fig. 2 shows a sectional view on line *o o* of Fig. 1. Fig. 3 shows a sectional view on line *b b* of Fig. 1. Fig. 4 shows a sectional view on line *a a* of Fig. 1. Fig. 5 shows a vertical sectional view of the attaching device with the seat-post in position within the attaching device. Fig. 6 shows a bottom view of the attaching device with the seat-post in section. Fig. 7 shows the tapering spreading and clamping device detached.

Similar letters refer to similar parts throughout the several views.

The attaching device consists of a cylindrical part provided with a screw-thread, said cylindrical part being composed of the main body, having a flaring slot and a tapering part adapted to fit the flaring slot, said tapering part adapted to move longitudinally and laterally with reference to the main body of the cylinder, as hereinafter described.

A represents the main body of the cylinder, and B represents the tapering portion of the cylinder, which is adapted to fit into a corresponding slot in the main body A.

D represents a nut provided with an internal screw-thread, which thread engages with the thread C on the part A of the cylinder. The tapering part B is provided with a flange F, which engages with the annular slot E of the nut D. The slot in the part A of the cylinder is beveled, as shown in Fig. 3, and the tapering piece B is also beveled, so as to fit the beveled portion of the slot. When the tapering piece B is placed into the nut so that the flange F fits into the groove E and before the nut is screwed down for the purpose of making the attachment hereinafter described, the tapering piece B fits the part A of the cylinder, so as to make a complete circle, as shown in Figs. 3 and 4.

It will be understood that the cylinder A B is placed inside of the socket to which the same is to be attached and that inside of the cylinder there is placed the seat-post I or any other cylindrical body which is to be attached by means of my attaching device above described.

When it is desirable to make the attachment, the nut D is turned so as to travel downward on the cylinder A. The flange F of the tapering piece B engages with the slot E and will therefore be crowded down into the flaring slot of A, and inasmuch as the sides of the tapering piece B are beveled when the cylindrical portion A is pressed against the socket and the tapering piece B is driven into the flaring opening or slot the lower end of the tapering piece B will be pressed inwardly, while the part A will be pressed outwardly. The position of the tapering piece when the nut is lowered is shown in Fig. 5. The upper part of the tapering piece B is preferably slightly flared in the other direction, as shown by H and H' in Fig. 4. The seat-post clamped within the attaching device is shown by I in Fig. 5. I thus accomplish by means of a single tapering and beveled section of the cylindrical attaching device both an inward-clamping pressure upon the seat-post or other cylindrical body within the attaching device and also an expansion of the cylindrical attaching device, whereby the same becomes firmly attached to the socket, the inward pressure upon the tapering piece B being given by the beveled form of the slot in the part A of the cylinder, while the cylinder expansion is given by the longitudinal movement of the tapering piece B. Thus I accomplish a secure and safe attachment by the use of a single cylinder composed of two parts in connection with a nut engaging with screw-threads on one part of the cylinder and by a groove in the nut and a flange on the other part of the cylinder.

Having thus described my invention, what I claim to have invented, and desire to secure by Letters Patent, is—

1. In an attaching device for the purpose of securing one portion of a piece of machinery to another portion having a socket, the combination of a cylinder made in two parts, one part provided with screw-threads and a tapering slot, beveled at its edges, a nut engaging with the screw-threads on the said part containing the beveled slot, and a tapering piece adapted to engage with the said nut and to be pressed downward into the tapering slot by means of the nut and to be pressed against the body to be attached to the socket, and at the same time to expand the main portion of the said cylinder against the inner periphery of the socket, substantially as described.

2. In combination with a cylinder having a tapering slot with beveled edges, screw-threads upon the said cylinder, a tapering piece adapted to fit into said tapering slot so as to complete the cylinder, a nut adapted to engage with the screw-threads on the said cylinder and provided also with an annular groove engaging with a flange at the upper end of said tapering piece, substantially as described.

3. In a clamping device for adjustably securing together two parts, one of which has a socket, the combination of a cylinder made in two parts, a larger and a smaller part, the larger part being provided with a tapering slot having beveled edges, the smaller part being tapering in form and having beveled edges adapted to fit said tapering slot, the larger portion provided with screw-threads, a nut adapted to engage with the screw-thread on the said larger part of the cylinder, and a groove adapted to engage with a flange at the upper or larger end of the said tapering part, said tapering part adapted to be pressed downward by means of the said nut spreading the larger portion of the said cylinder in contact with the inner periphery of the socket, and a beveled portion adapted to press said tapering portion inward in contact with the body to be attached to said socket, substantially as described.

In testimony whereof I have hereunto set my hand in presence of two subscribing witnesses.

AUGUSTUS C. CULVER.

Witnesses:
EDWARD TAGGART,
CHRISTOPHER HONDELINK.